(12) United States Patent
Vegter

(10) Patent No.: US 6,286,073 B1
(45) Date of Patent: Sep. 4, 2001

(54) INTEGRATED CIRCUIT INTERFACE BETWEEN A PERSONAL COMPUTER AND AN EXTERNAL DEVICE

(75) Inventor: Kornelis Hendrik Vegter, Eemnes (NL)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/203,096

(22) Filed: Dec. 1, 1998

(51) Int. Cl.⁷ ........................................... G06F 13/38
(52) U.S. Cl. ..................... 710/129; 710/63; 710/64; 710/72
(58) Field of Search ................. 710/36, 37, 62, 710/63, 64, 65, 72, 73, 126, 127, 129

(56) References Cited

U.S. PATENT DOCUMENTS

| | | | |
|---|---|---|---|
| 5,197,128 | * 3/1993 | Campbell et al. ................... | 710/129 |
| 5,423,697 | * 6/1995 | MacGregor ........................... | 439/638 |
| 5,638,530 | * 6/1997 | Pawate et al. ......................... | 710/63 |
| 5,778,205 | * 7/1998 | Orimoto ............................... | 710/129 |
| 5,812,798 | * 9/1998 | Moyer et al. ......................... | 710/127 |
| 5,928,341 | * 7/1999 | Liang .................................... | 710/72 |
| 6,081,856 | * 6/2000 | Comer .................................. | 710/67 |
| 6,131,125 | * 10/2000 | Rostoker et al. .................... | 709/250 |
| 6,151,652 | * 11/2000 | Kondo et al. ....................... | 710/129 |

* cited by examiner

Primary Examiner—Robert Beausoleil
Assistant Examiner—Raymond N Phan

(57) ABSTRACT

An interface for communicating data to an integrated circuit interface on an external device. A connector comprises a connector block having a plurality of innerconnections therein, and a plurality of individual connectors. A first cable for electrical communication to at least one of the connectors in the connector block is adapted to transfer data from a personal computer to the integrated circuit interface. A second cable is also provided in electrical communication with the connector block, and is adapted to transfer integrated circuit commands through the connector block.

16 Claims, 4 Drawing Sheets

INTEGRATED CIRCUIT INTERFACE BETWEEN A PERSONAL COMPUTER AND AN EXTERNAL DEVICE

BACKGROUND OF THE INVENTION

1. Field of the Invention

The present invention generally relates to interfaces for communicating data between personal computers and external devices. More specifically, the invention relates to integrated circuit interfaces.

2. Description of the Related Art

The integrated circuit to integrated circuit ("I2C", pronounced "eye—square—see") interface is a two wire, synchronous, serial interface that was developed by Philips Electronics so that integrated circuits (IC's) could talk to one another and transfer information between IC's without signal degradation. The I2C interface is used extensively in micro controller—based professional, consumer and telecommunications applications as a control, diagnostic and power management bus. The I2C interface utilizes a simple, bi-directional 2-wire, serial data (SDA) and serial clock (SCL) bus for inter—IC control. Each of the devices containing integrated circuits is recognized by the I2C bus with a unique address, and can operate as either a receiver - homing device, or as a transmitter with the capability to both receive and send information.

Today, the I2C bus can operate at up to 400 Kbits per second, and has 19 bit addressing. Its current implementation allows level shifting, and fully bi-directional data transfer between I2C devices operating from different supply voltages. Ten bits are used for the external device addresses, allowing for up to 1,024 additional addresses to prevent problems associated with allocation of share addresses as the number of I2C devices rapidly expands. The remaining nine bits are used as command bits. The I2C interface specification is publicly available from Phillips Electronics and can be found either at the Phillips Electronics Web Site, www-US2.semiconductors.phillips.com/I2C/, or can be obtained from Phillips by writing to them and requesting a copy. The I2C interface specification is specifically incorporated herein by reference.

While the I2C interface provides an elegant and simple solution for interfacing integrated circuits to one another, when it is necessary to interface an external I2C device with a personal computer, additional hardware is typically needed which is expensive, cumbersome to use and not versatile. Thus, the integrated circuit art has not heretofore created a solution for simple and effective I2C interfacing between a personal computer and any I2C device.

SUMMARY OF THE INVENTION

The aforementioned long felt needs are fulfilled, and problems solved, by interfaces in accordance with the present invention for communicating data between a personal computer and an external device. The interfaces preferably comprise a first device for transferring data between the personal computer and the external device, said first device adapted to communicate with an integrated circuit interface on the external device. Even more preferably, the interface further comprises a second device in communication with said first device for generating the data.

In a further preferred aspect of the invention, methods of transferring integrated circuit commands between an external device having an integrated circuit interface thereon solve the aforementioned long felt needs. The methods preferably comprise the step of reading an address byte from the integrated circuit interface on the external device. Even more preferably, writing the address byte is accomplished to an address buffer on the personal computer. Still more preferably, transferring data from the personal computer is accomplished to the external device through a connector that is connected to the integrated circuit interface on the external device. Still more preferably, determining whether a next address should be read occurs through the integrated circuit interface on the external device.

The methods and apparatus disclosed and claimed herein provide efficient and effective devices and methods for I2C interfacing between an external device and a personal computer. Interface devices in accordance with the present invention are economical to fabricate, and allow for universal interfacing between external devices and personal computers, in a test or other environment. Such needs have not heretofore been achieved in the integrated circuit art.

The invention will be best understood by those with skill of the art by reading the following detailed description of the presently preferred embodiments, in conjunction with the drawings which are first described briefly below.

DETAILED DESCRIPTION OF THE PRESENTLY PREFERRED EMBODIMENTS

Figure 1:
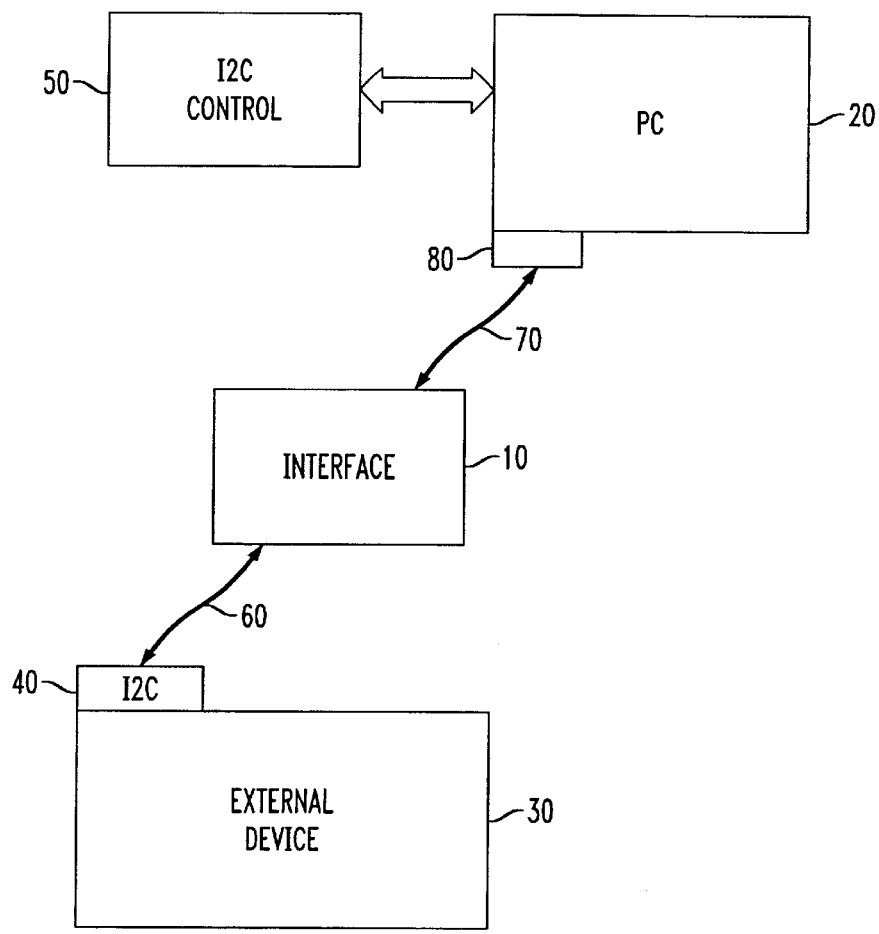
FIG. 1 is a functional block diagram of the interface of the present invention which connects a personal computer to an external device.

Referring now to the drawings, wherein like reference numerals refer to like elements, throughout the several views, an interface 10 of the present invention is connected to a personal computer 20 which is operable to control or test the operation of an external device, shown generally at 30. The interface 10 is adapted to transfer data between the personal computer 20 and the external device 30, and is further adapted to communicate with conventional or standardized integrated circuit (I2C) interface 40 on or of the external device 30. As used herein, the term "data" denotes I2C commands, addresses and any other information that is transmitted between the personal computer 20 and the external device 30. A control element 50 is in communication with the personal computer 20, and thereby interface 10, and operatively transmits I2C commands between personal computer 20 and external device 30.

The interface 10 is preferably in electrical communication with I2C interface 40 through first cable 60 along which data is transferred from personal computer 20 to the I2C interface 40. Even more preferably, a second cable 70 is in electrical communication with interface 10, for transferring the I2C commands to the first cable 60 and through interface 10. The control element 50 electrically communicates with the second cable 70 and generates the I2C commands that will be transferred to the I2C interface 40 though the first and second cables 60 and 70, respectively.

Second cable 70 is connected to the personal computer 20 through a port 80 on the personal computer. Any of the standard ports available to or present in a personal computer may be adapted to receive cable 70 and to transfer data to and from personal computer 20. In a preferred embodiment of the invention, port 80 is a parallel port (e.g., LPT1) of a personal computer.

The I2C interface 40 is commercially available from Phillips Electronics, or any one of its licensees, and will conventionally have been integrated in external device 30 so that the external device is ready to receive and transmit I2C commands. External device 30 may be any type of device available in the art that is adapted to communicate using an I2C interface with integrated circuits of other devices. Thus, external device 30 may by way of example be a printer, a monitor, a scanner, or any other piece of consumer or industrial electronics, that must be tested and/or utilized with integrated circuits. It will also be recognized by those with skill in the art that I2C control block 50 could be a software program that runs on personal computer 20, or may be an integrated circuit chip which has the particular I2C software in accordance with the present invention burned into or stored within it. Alternatively, the control block 50 may be a programmable integrated circuit, or a programmable logic array. In a currently preferred embodiment, I2C control block 50 is a compiled C-program, that runs on personal computer 20.

Figure 2:
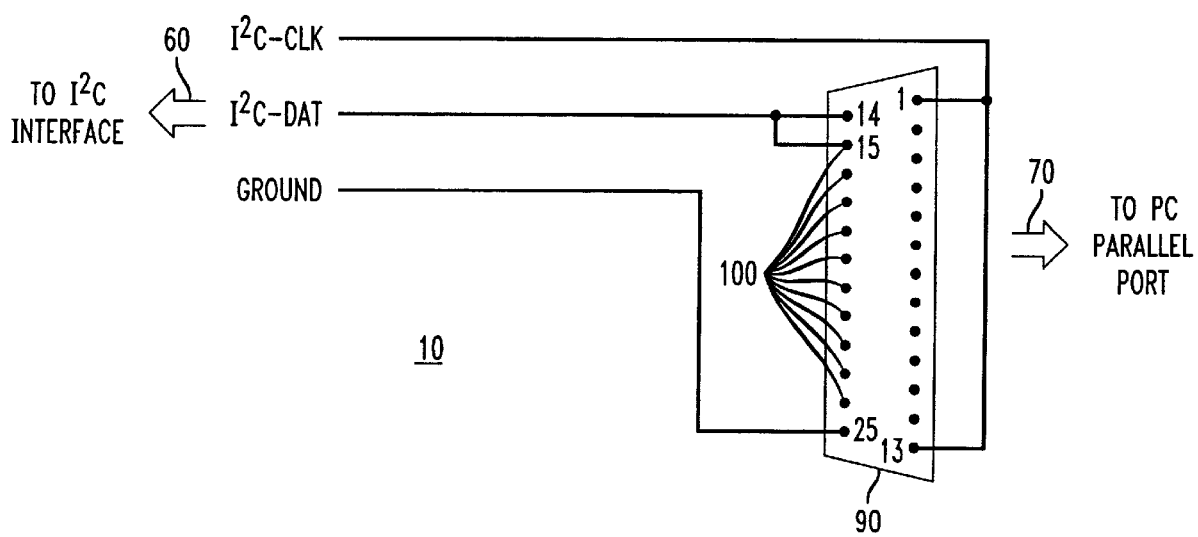
FIG. 2 is a schematic diagram of the interface of the present invention for interfacing I2C data from a personal computer to an I2C interface in an external device.

Interface 10 is schematically shown in FIG. 2. Interface 10 preferably comprises a connector block 90 having a plurality of interconnections therein, and a plurality of connectors or connector points, shown generally at 100. More preferably, the connector block 90 is a twenty five pin-male connector having two interconnections; the connections between pins 1 and 13, and between pins 14 and 15. First cable 60 may comprise a three wire cable connected to the I2C interface 40. The three wires of cable 60 communicate with connector block 90 through pins 1, 14 and 25. Pin 1 is adapted to receive the I2C clock data (SCL). Pin 14 is adapted to receive the I2C address data (SDA) corresponding to the type of external device that is connected to personal computer 20. Pin 25 receives a ground connection for the third wire in cable 60. Cable 70 conventionally connects interface block 90 to the parallel port 80 of the personal computer 20. It will be appreciated by those with skill in the art that any connector device capable of completing the three necessary I2C connections described herein may be used.

When the parallel port of the personal computer 20 is used to receive the I2C interface, the I2C data may be bussed to and from the external device 30 and personal computer 20 conventionally as is other data. As is known to those with skill in the art, a parallel port on a personal computer general comprises a data buffer port typically having an address 0×378, a read port typically having an address 0×379, and a read/write port having a normal address 0×379. The read and read/write ports are used for the I2C interface in accordance with the present invention. However, since some personal computers only have a write port, with address 0×37a, two ports may in those circumstances be necessary to implement the I2C interface of the present invention.

Pin 25 is the ground connection for the I2C interface. The SCL signal is connected to pin 13 for reading (bit 4 of address 0×379), and to pin 1 (bit 0 of address 0×37a) for writing. The SDA signal is connected to pin 15 for reading (bit 3 of address 0×379) and to pin 14 (bit 1 of address 0×37a) for writing. The two write pins are inverted at the parallel port as a function of the LPT1 application.

Figure 3:
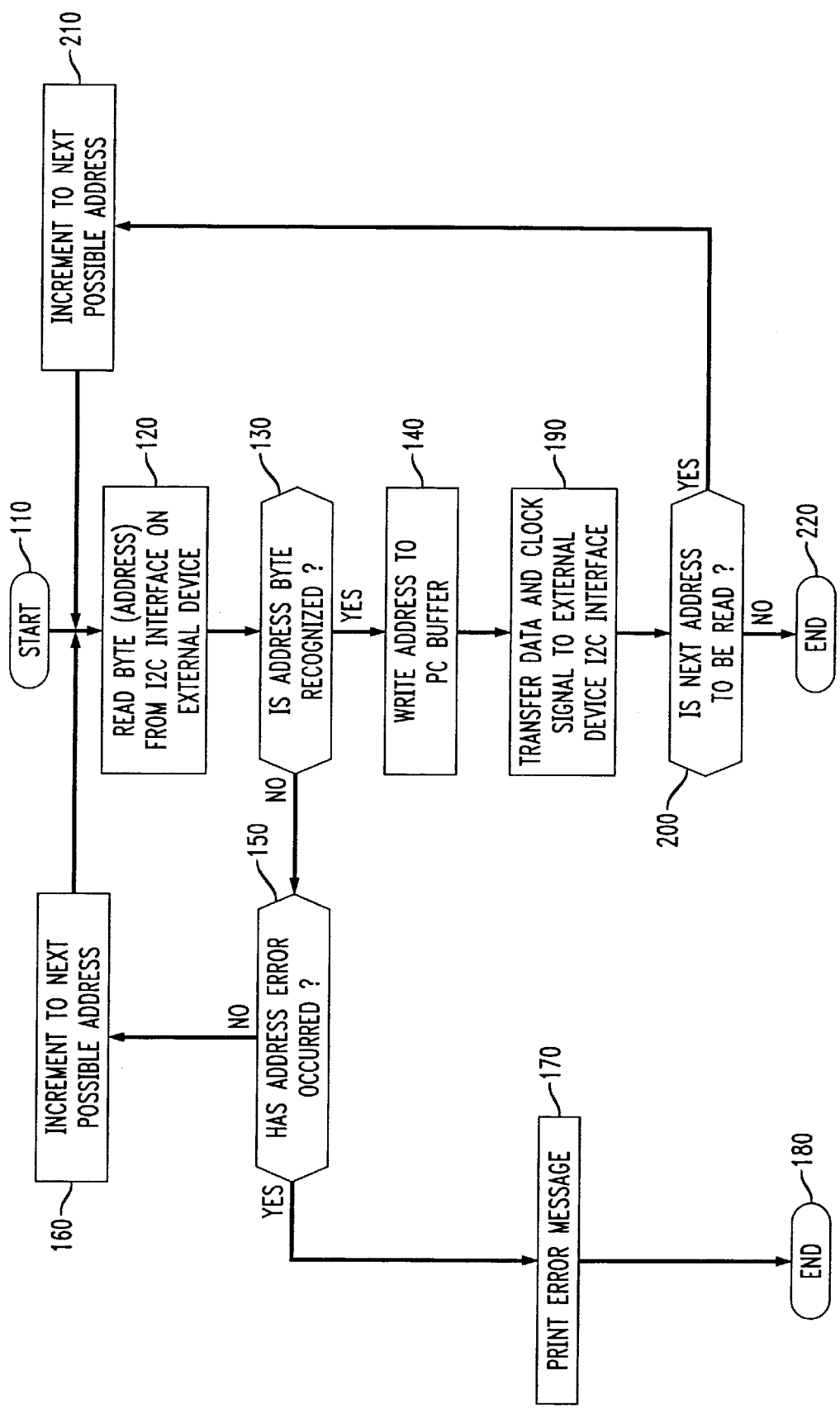
FIG. 3 is a flow chart of a method in accordance with the present invention for interfacing I2C data from a personal computer to an external device.

The reading and writing I2C addresses to and from the external device 30 is accomplished, in a preferred embodiment, with a general purpose program compiled (by way of example) from C language. FIG. 3 illustrates a flow chart of the operation of this program. By accessing personal computer 20 with a standard keyboard, the program can be started at 110. An address byte is read at 120 from the I2C interface 40 on external device 30. If the byte is recognized at 130, it is written at 140 to the address buffer of personal computer 20. If the byte is not recognized at 130, then the program determines whether an address error has occurred at 150. If an address error has not occurred, the next address is incremented at 160 and the process begins again at 120. If an address error has occurred, then an error message is printed at 170 and the program exits at 180.

After the address of the external device has been written to the address buffer of personal computer 20 at step 140, data and the clock signal are transferred to the external device 30 through I2C interface 40. If the next address is to be read at step 200, the next address is incremented at step 210 and the process begins again at step 120. Otherwise, the program exits at step 220. Preferably, the I2C address values and the values written to the I2C interface are in hexadecimal, although other data formats are equally usable. Thus, in order to read address I20, for example, the program executes a read from address 0X20. Similarly, if the address IQ4A0 must be written, then the address is written as 0XA0 to address 0X24. Errors will occur when writing to, or reading from, an address that does not exist or that is not connected to I2C interface 40.

The I2C interface of the present invention may be used in several master and slave configurations. Since a personal computer can only work as a master, the I2C interface in accordance with the present invention will typically find its way only into situations where a master condition is accepted. Thus, the only commands that are transferred are the start condition, the send byte, the receive byte, and the stop condition. In accordance with the invention, the I2C action can be a read, a write, or any combination of reads and writes.

Figure 4:
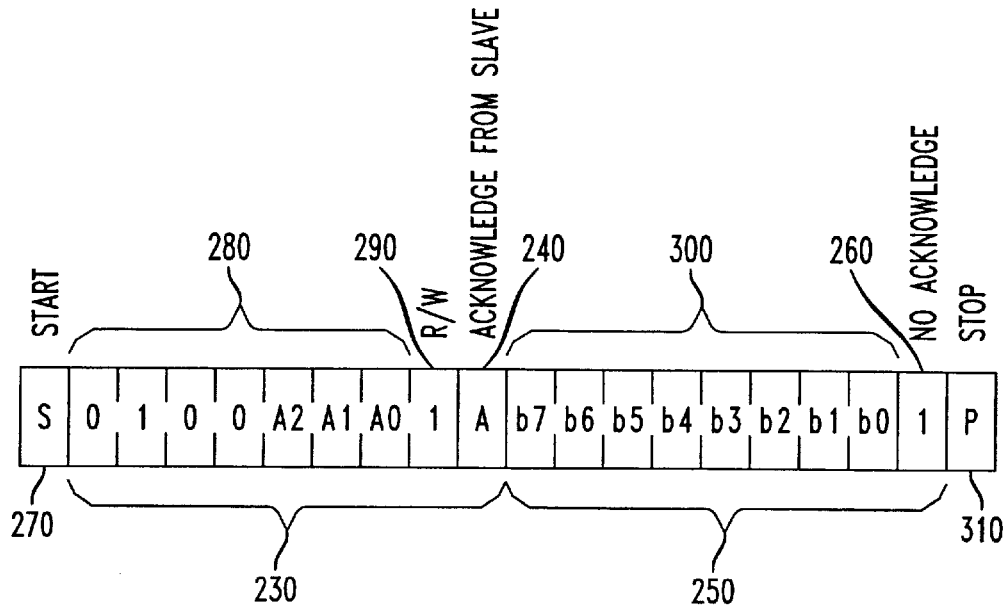
FIG. 4 is a schematic diagram of an I2C word in accordance with the invention for performing a read action.

Reference is now made to FIG. 4, in which a simple read action is shown. The send byte 230 ends with an acknowledge bit "A" at 240. Similarly, the receive byte 250 ends with a no acknowledge bit "1" shown at 260. In accordance with the invention, an I2C read action starts with a send bit "S" at 270, followed by the entire send byte 230 which consists of the slave address 280 plus the read/write bit "1" at 290 and the acknowledge bit 240. The receive byte 250 is then sent, which consists of the data byte from the parallel port 300 as well as the no acknowledge bit "1" at 260. A stop condition bit "P" 310 is then read.

Figure 5:
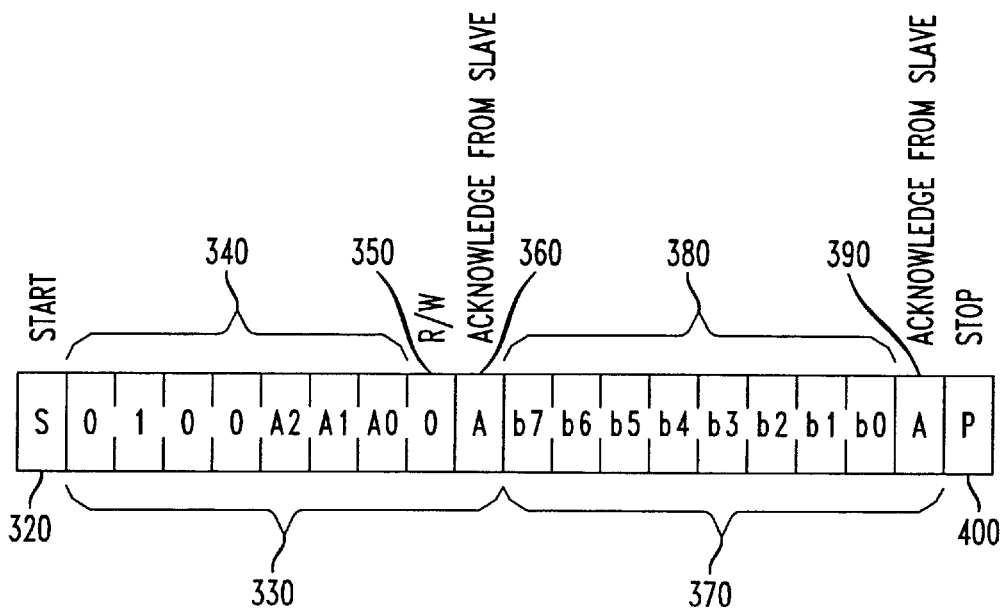
FIG. 5 is a schematic diagram of an I2C word in accordance with the invention for performing a write action.

FIG. 5 illustrates a simple write action in accordance with the present invention. A send bit "S" 320 initiates the write action. The send byte 330 is then sent, which consists of the slave address 340, the read/write flag set to "0" for the write action at 350, and the acknowledge bit "A" 360. Since the I2C write action consists of two bytes, the send byte 370, which consists of the data 380 plus the acknowledge bit 390, is then bussed. The stop bit "P" at 400 is then received.

Figure 6:
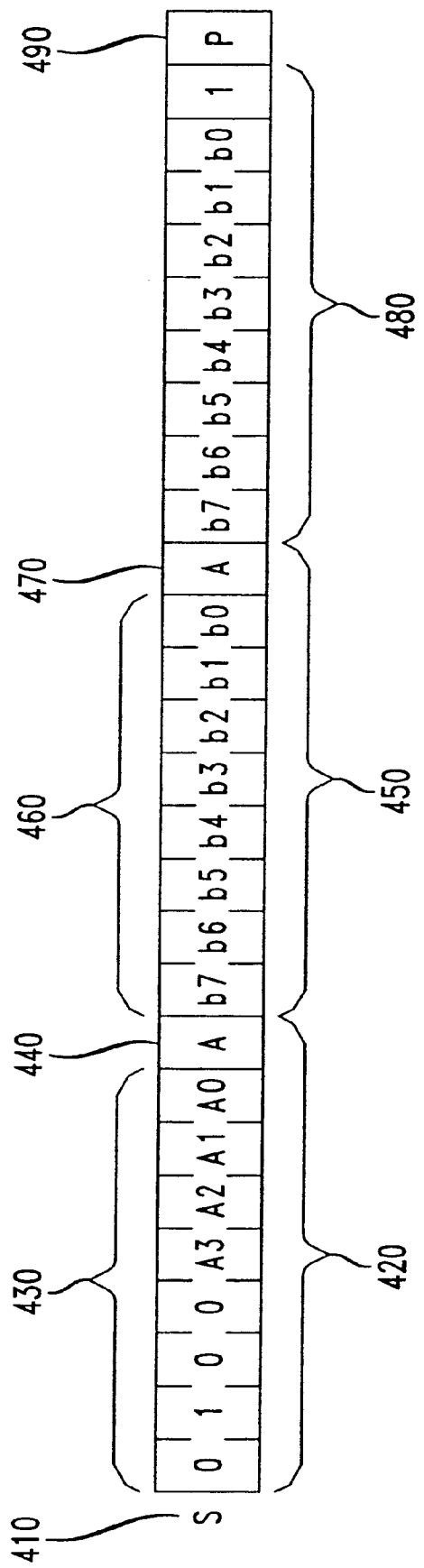
FIG. 6 is a schematic diagram of an alternative embodiment of an I2C word in accordance with the invention.

When an I2C interface 40 is obtained which uses the Philips Electronics standard, the read/write bit is always defined as a "1" for read, and a "0" for write. However, other licensees and vendors of the I2C interface 40 may include the read/write position for addressing, in which case the write or read action is defined by a data byte. Such an arrangement for the read/write condition is shown in FIG. 6. The start condition begins at 410, and the send byte 420 is sent, containing the slave address 430 and acknowledge bit "A" at 440. A second byte 450 is then sent, which contains the data 460 and the acknowledge bit "A" at 470. A receive byte 480 is then sent when, for example, special contents are necessary. The read/write action is ended by the stop bit "P" at 490. In this way, the read/write position for addressing can be accomplished in accordance with the present invention by defining the read or write action as a data byte.

As stated above, it is preferable to implement the I2C control function of the present invention with a C software program. The software program listed in the appendix hereto provides an example of such a program, implementing the desired I2C commands desired in accordance with the present invention. The program runs on personal computer 20 and can be compiled in Turbo C, which is available from the Borland Company, or by the C++compiler available from Microsoft Corporation. The program preferably contains four subroutines for the start and stop conditions, and the send and receive bytes. In addition to these four subroutines, routines are included to set the clock and data signals of the I2C interface 40. The program is personal computer independent and so, at the start of the program, the address of the LPT1 port is determined through a search, and the speed of the central processing unit (CPU) of personal computer 20 is measured. Depending on the sensed speed of the CPU, three delay variables CPU2, CPU4 and CPU6 are set.

Typically, the parallel port of a personal computer is intended to control printers, scanners and other external devices. After the I2C action occurs in accordance with the invention, the contents of the write port at LPT1 may no longer work for the desired control of the external device. Thus, the program saves the initial content of address 0×37a and restores it after exiting so that the LPT1 print will therefore properly function for the desired external device. The program allows for seven types of address errors and, if an address error exists as was discussed with respect to the flowchart of FIG. 3, an identifying error or code number is outputted.

The program in the following appendix is intended to read and write to normal I2C interfaces with two bytes, and so the address is calculated to the first send byte. When the first send byte is read, this byte ends with a "1", and when it is written it ends with a "0." If three or more bytes are needed, the program may be easily extended by those with onlining skill in the art.

The I2C interfaces provided in accordance with the present invention, and the methods of interfacing to external devices described herein, are readily accomplished without the need for additional hardware. The methods and apparatus described herein do not require designers to buy special hardware to test external devices with I2C interfaces, and therefore can be utilized with any standard personal computer. This advantageously alleviates the need to buy a personal computer with an I2C reading and writing interface, thereby greatly reducing the cost of testing external equipment that will be I2C interfaced. Such results have not heretofore been achieved in the art.

There have thus been described certain preferred embodiments of methods and apparatus for I2C interfaces provided in accordance with the present invention. While preferred embodiments have been described and disclosed, it will be recognized by those skilled in the art that modifications are within the true spirit and scope of the invention. The appended claims are intended to cover all such modifications.

Attorney Docket No.: Vegter 2   Express Mail No.: EL136649855US

APPENDIX

```
#include <stdio.h>
#include <dos.h>
#include <string.h>
#include <process.h>
#include <time.h>
include <bios.h> define C1     0x01
define CR     0x10
#define C0     0xfe
#define D1     0x02
#define DR     0x08
#define D0     0xfd
define WAITC  0xff void CLOCK1(void);          /* set CLK to '1' independent of DAT  */
void CLOCK0(void);          /* set CLK to '0' independent of DAT  */
void DATA1(void);           /* set DAT to '1' independent of CLK  */
void DATA0(void);           /* set DAT to '0' independent of CLK  */
int  CLOCKR(void);          /* read CLK                           */
int  DATAR(void);           /* read DAT                           */ void NOP(int);              /* delay routine                      */ void SEND_START(void);      /* Start condition                  ..*/
void SEND_BYTE(int);        /* Send byte                          */
int  RECEIVE_BYTE(void);    /* Receive byte                       */
void SEND_STOP(void);       /* Stop condition                     */ int ADDRW;
int ADDRR;
int ERROR,PP,cpu2,cpu4,cpu6;

int a37a;
main()
{
char v[40];
```

S:\bdb\4167-174.PA

14

Attorney Docket No.: Vegter 2  Express Mail No.: EL136649855US

```
     int ad,adr,adw,dt,r,tp,retry;
     time_t start,stop;
     ADDRR = peek(0x40,8)+1;          /* get second LPT1 address        */
     ADDRW = ADDRR+1;                 /* get third LPT1 address         */
 5   a37a = inp(ADDRW);               /* save contents third LPT1 address */
     tp = 0;
     time(&stop);
     while(time(&start) == stop);
     while(time(&stop) == start) tp++
10   cpu2 = (int)tp/1000.0;           /* calculate delay for 2 us       */
     cpu4 = cpu2*2                    /* calculate delay for 4 us       */
     cpu6 = cpu2*3;                   /* calculate delay for 6 us       */ hh: printf("Action:");
15       gets(v);
         if (strlen(v) == 0)
         {
         printf("End program\n");
         outpADDRW,a37a);             /* restore contents 3e LPT1 address */
20       exit(1);
         {
         if (v[0] == 'h')
         }
         printf("\nPossible actions\n");
25       printf(
         "ixx  : read 12C address xx\n");
         printf(
         "ixxdd :write dd to address xx\n");
         printf("\n");
30       goto hh;
         }
         if (strlen(v) == 3)
         {
         sscanf(&v[1], " % x",&ad);
35       adr = (ad<<1) l 1;           /* make read addresses            */
         for (retry=0;retry<=1;retry++)
         {
         SEND_START();
         SEND_BYTE(adr);
40       r=RECEIVE_BYTE();
```

S:\bdb\4167-174.PA

Attorney Docket No.: Vegter 2  Express Mail No.: EL136649855US

```
         SEND_STOP();
         if(ERROR = = 0)
         {
         if((r > =0x20) && (r< ='z'))
 5       {
         printf("1%x =/%xdec%3d char '%c'\n",ad,r,r,r);
         } else
10       {
         print ("1%x=1%xdec%3d\n",ad,r,r);
         break;
         }
         }
15       if (ERROR !=0
         }
         goto hh;
         }
         if (strlen(v) = = 5)
20       {
         sscanf(&v[1]," %2x%2wx",&ad,&dt)
         adw = (ad< <1)& oxfe;              /*make write address      */
         for (retry=0;retry,= < =1;retry+ +)
         {
25       SEND_START();
         SEND_BYTE(adw);
         SEND_BYTE(dt);
         SEND_STOP();
         if (ERROR= =0) break;
30       }
         if (ERROR!=0)
         {
         print ("I2>-write error c/id!!\n", ERROR);
         }
35       % to hh
         goto hh
         }
         printf("Input error!!\n");
         goto hh;
40       }
```

Attorney Docket No.: Vegter 2　　　　　　　　　　　　　　　Express Mail No.: EL136649855US

```
            void CLOCK1(void)
            {
            PP = PP lC1;
            outp(ADRW,~PP);
 5          }
            void CLOCK0(void)
            {
            pp=ppf co
            outp(ADDRW, ~PP);
10          void DATA1(void)
            {
            PP=PPlD1;
            outp(ADDRW~PP);
            }
15          voidDATA0(void)
            {
            PP=PP&D0;
            outp(ADDRW,~PP);
            }
20          int CLOCKR(void)
            {
            if((inp(ADDRR) & CR) = = 0) return(0);
            else return(1);
            }
25          intDATAR(void)
            {
            if (inp(ADDR)bDR)= =0) return(o)
            else return L1);
            }
30          void NOP(int d)
            {
            int k;
            for(k=0;k<d;k++);
            }
35          void SEND_START(void)
            {
            int WAIT1;

outp(ADDRW,0);              /*start with CLK & DAT '11'      */
```

S:\bdb\4167-174.PA

Attorney Docket No.: Vegter 2            Express Mail No.: EL136649855US

```
        PP = 0;                              /*init CLK & DAT to '1'   */
        ERROR = 0;                           /*init ERROR              */
        CLOCK1();                            /*clock one               */
        disable();                           /*disable PC interrupts   */
        for (WAIT1=WAITC;WAIT1!=0;WAIT1--)   /*check if clock-line is  */
        {                                    /*one. Test time is:      */
          if (CLOCKR() = = 1) break;         /*wait * 9 usec.          */
          if (WAIT1 = = 1)
          {
            ERROR = 1;                       /*test time too long error */
            return;
          }
        }
        DATA0();                             /*send start condition    */
        NOP(cpu6);                           /*wait 6 usec.            */
        CLOCK0();                            /*clock to zero           */
        } void SEND_BYTE(int SB)
        {
        int COUNT,WAIT1,SND_BYTE;

if(ERROR != 0) return;
        SND_BYTE = SB;
        for (COUNT=8; COUNT!=0; COUNT--) /*loop count for 8 bits       */
        {
          if((SND_BYTE & 0x80) != 0)
          {
            DATA1();                         /*send data bit = 1       */
          }
          else DATA0();                      /*send data bit = 0       */
          SND_BYTE = SND_BYTE<<1;            /*shift send-data one bit */
          CLOCK1();                          /*clock bit to one        */
          for (WAIT1=WAITC;WAIT!=0;WAIT1--) /*check if clock-line is  */
          {                                  /*one. Test time is:      */
```

S:\bdb\4167-174.PA

Attorney Docket No.: Vegter 2             Express Mail No.: EL136649855US

```
            if(CLOCKR() == 1) break;              /*wait*9 asec                  */
            if (WAITI == 1)
            {
            ERROR = 3;
            return;                               /* wait time too long error    */
            }
            }
            CLOCK0();                             /*clock to zero
    */
            }                                     /*next bit until 8 done
    */
            DATA1();                              /*data to one to prepare       */
            NOP(cpu2);                            /*for ackn.then wait 2 usec.   */
            CLOCK1();                             /*clock to one                 */
            for (WAITI=WAITC; WAITI!=0;WAITI--)   /*check if clock-line is
    */
            {                                     /*one, Test Time is            */
            if (CLOCKR() == 1)
            {
            break;                                /*wait * 9 usec.               */
            }
            if (WAITI == 1)
            {
            ERROR = 4;                            /* wait time too long error    */
            return;
            }
            }
            if (DATAR() == 1)
            {
            ERROR = 5;
            return;                               /*check acknowledge bit
    */
            }
            CLOCK0();                             /*clock to zero
    */
            }
            iint RECEIVE_BYTE(void)
            {
            int COUNT,WAIT,REC_BYTE;
```

Attorney Docket No.: Vegter 2  Express Mail No.: EL136649855US

```
        if (ERROR !=0) return(0);
        REC_BYTE = 0;
        for (COUNT=8; COUNT!=); COUNT--)_       /*loop count for 8 bits
          */
        {                                        /*one Test time is:          */
        CLOCK1();                                /*clock to one               */
        for (WAITI=WAITC;WAITI!=0;WAITI--/*check if clock-line is             */
        {
        if (CLOCKR() == 1) break;                /*wait * 9 usec.
         */

{
        if(CLOCKRL)== = 2) break;
        if(WAITI == 1)
        {
        ERROR = 6;
        }
        }
        }
        return(0);                               /*wait time too long error   */
        REC_BYTE =BYTE = REC_BYTE<<1;            /* shift data bit one place
         */

REC_BYTE = REC_BYTE I DATAR();           /*get new data bit           */
        CLOCK0();                                /*clock to zero
         */

NOP(cpu2);                               /*wait 2 usec.               */
        }
        DATA1();                                 /*next bit until 8 done
         */

NOP(cpu4);                               /*wait 4 usec.               */
        CLOCK1();                                /*clock to one               */
        for ((WAITI=WAITC;WAITI!=0; WAITI--)     /*check if clock-line is
         */
        {                                        /*one. Test time is:         */
        if (CLOCKR() == 1) break;                /*wait 9 usec.
         */
        if(WAITI == 1)
        {
        ERROR = 7;
        return(0);                               /*wait time too long error   */
        }
        void SEND_STOP(void)
```

S:\bdb\4167-174.PA

What is claimed is:

1. An interface for communicating data between a personal computer and an external device, comprising:
- a first device for transferring data between the personal computer and the external device, said first device being adapted to communicate with an integrated circuit interface on the external device;
- a first transmission device comprising a three wire cable, said first transmission device being connected to said first device and to the integrated circuit interface in the external device for transmitting the data between the personal computer and the external device;
- a second device in communication with said first device; and
- a second transmission device connected to said first device for transporting the data from the personal computer to said first device, said second transmission device being configured for connection to a parallel port on the personal computer.

2. The interface recited in claim 1, wherein said second device generates integrated circuit commands for input to the integrated circuit interface on the external device.

3. The interface recited in claim 2, wherein said second device comprises a computer program.

4. The interface recited in claim 2, wherein said second device comprises an integrated circuit chip.

5. The interface recited in claim 1, wherein said first device comprises a connector block.

6. The interface recited in claim 5, wherein said connector block comprises a twenty-five pin male connector.

7. A connector for communicating data to an integrated circuit interface on an external device, comprising:
- a connector block having a plurality of interconnections therein, and a plurality of individual connectors;
- a first cable in electrical communication with at least one of the interconnections in the connector block and for selective communication with the integrated circuit interface on the external device, and that is adapted to transfer data from a personal computer to the integrated circuit interface, said first cable comprising a three-wire cable for connecting to three individual connectors in the connector block; and
- a second cable in electrical communication with the connector block and adapted to transfer integrated circuit commands through the connector block to the first cable for receipt by the integrated interface on the external device.

8. The connector recited in claim 7, wherein said connector block comprises twenty-five individual connectors.

9. The connector recited in claim 8, wherein said first cable is further adapted for connection to a parallel port on the personal computer.

10. The connector recited in claim 9, further comprising a control block in electrical communication with the second cable for generating integrated circuit commands for transfer to the integrated circuit interface on the external device through said first cable.

11. The connector recited in claim 10, wherein said control block comprises a software program.

12. The connector recited in 10, wherein said control block comprises an integrated circuit chip.

13. A method of transferring integrated circuit commands between an external device having an integrated circuit interface thereon, comprising the steps of:
- reading an address byte from the integrated circuit interface on the external device;
- determining whether the address byte is recognized by the personal computer and incrementing to the next address byte if the personal computer does not recognize the address byte;
- writing a recognized address byte to an address buffer on the personal computer;
- transferring data from the personal computer to the external device through a connector that is connected to the integrated circuit interface on the internal device; and
- determining whether a next address should be read through the interface on the external device.

14. The method recited in claim 13, further comprising the step of determining whether an address error has occurred if the personal computer does not recognize the address byte.

15. The method recited in claim 14, further comprising the step of printing an error message if an error has occurred.

16. The method recited in claim 15, further comprising the step of writing the next address to the address buffer.

* * * * *